US012665344B2

(12) United States Patent
Moreau et al.

(10) Patent No.: US 12,665,344 B2
(45) Date of Patent: Jun. 23, 2026

(54) MODULAR BACKSHELL HOUSING

(71) Applicants: Connecteurs Electriques Deutsch, Evreux (FR); Tyco Electronics UK LTD, Swindon (GB)

(72) Inventors: Jean-Luc Moreau, Evreux (FR); Martin Paul, Swindon (GB); Ralf Styles, Swindon (GB)

(73) Assignees: Connecteurs Electriques Deutsch, Evreux (FR); Tyco Electronics UK Ltd., Swindon (GB)

( * ) Notice: Subject to any disclaimer, the term of this patent is extended or adjusted under 35 U.S.C. 154(b) by 462 days.

(21) Appl. No.: 17/743,664

(22) Filed: May 13, 2022

(65) Prior Publication Data

US 2022/0271469 A1 Aug. 25, 2022

Related U.S. Application Data

(63) Continuation of application No. PCT/EP2020/082033, filed on Nov. 13, 2020.

(30) Foreign Application Priority Data

Nov. 15, 2019 (EP) ..................................... 19306474

(51) Int. Cl.
*H01R 13/504* (2006.01)
*B23K 20/12* (2006.01)
(Continued)

(52) U.S. Cl.
CPC ........... *H01R 13/504* (2013.01); *B23K 20/12* (2013.01); *B23K 20/122* (2013.01); *H01R 13/58* (2013.01);
(Continued)

(58) Field of Classification Search
CPC ...... H01R 13/504; H01R 13/58; H01R 43/02; H01R 43/18; H01R 13/502; H01R 13/56;
(Continued)

(56) References Cited

U.S. PATENT DOCUMENTS 3,235,158 A * 2/1966 Hollander .............. B23K 20/12
228/114.5
5,796,040 A * 8/1998 Feketitsch ............ H02G 3/0633
174/650
(Continued)

FOREIGN PATENT DOCUMENTS

FR 2864713 A1 * 7/2005 ............. H02G 15/04
GB 2132935 A * 7/1984 ......... B29C 65/0672

OTHER PUBLICATIONS

PCT International Search Report, Application No. PCT/EP2020/082033, Dated: Feb. 1, 2021, 17 pages.
(Continued)

*Primary Examiner* — Justin M Kratt
(74) *Attorney, Agent, or Firm* — Barley Snyder

(57) ABSTRACT

A backshell housing includes a pair of housing parts including a first housing part and a second housing part friction welded to one another. A cable passage of the first housing part is continuous with a cable passage of the second housing part. At least one of the housing parts has a welding protrusion received in a welding notch of the other of the housing parts. The housing parts are friction welded at an interface of the welding protrusion and the welding notch.

19 Claims, 4 Drawing Sheets

(51) Int. Cl.

| | |
|---|---|
| *H01R 13/58* | (2006.01) |
| *H01R 43/02* | (2006.01) |
| *H01R 43/18* | (2006.01) |
| *B29C 65/00* | (2006.01) |
| *B29C 65/02* | (2006.01) |
| *B29C 65/06* | (2006.01) |
| *H01R 13/502* | (2006.01) |
| *H01R 13/56* | (2006.01) |
| *H02G 3/06* | (2006.01) |

(52) U.S. Cl.
CPC ............. *H01R 43/02* (2013.01); *H01R 43/18* (2013.01); *B29C 65/02* (2013.01); *B29C 65/06* (2013.01); *B29C 65/0672* (2013.01); *B29C 66/51* (2013.01); *B29C 66/52* (2013.01); *B29C 66/522* (2013.01); *B29C 66/5223* (2013.01); *H01R 13/502* (2013.01); *H01R 13/56* (2013.01); *H01R 13/562* (2013.01); *H01R 13/5804* (2013.01); *H01R 13/5833* (2013.01); *H01R 43/0207* (2013.01); *H02G 3/06* (2013.01)

(58) Field of Classification Search
CPC .............. H01R 13/562; H01R 13/5804; H01R 13/5833; H01R 43/0207; B23K 20/12; B23K 20/122; B29C 65/02; B29C 65/06; B29C 65/0672; B29C 66/51; B29C 66/52; B29C 66/522; B29C 66/5223; H02G 3/06
See application file for complete search history.

(56) References Cited

U.S. PATENT DOCUMENTS

| | | | |
|---|---|---|---|
| 2007/0022214 A1 | 1/2007 | Harcourt | |
| 2007/0222214 A1 | 9/2007 | Klinger | |
| 2012/0129375 A1 | 5/2012 | Van Swearingen | |
| 2019/0302140 A1* | 10/2019 | Pusheck | ............. H01R 13/6683 |

OTHER PUBLICATIONS

From Wikipedia, the free Encyclopedia, Friction Welding, Dated: Apr. 2, 2021, 3 pages, https://web.archive.org/web/20101120195944/http://en.wikipedia.org/.

\* cited by examiner

MODULAR BACKSHELL HOUSING

CROSS-REFERENCE TO RELATED APPLICATIONS

This application is a continuation of PCT International Application No. PCT/EP2020/082033, filed on Nov. 13, 2020, which claims priority under 35 U.S.C. § 119 to European Patent Application No. 19306474.8, filed on Nov. 15, 2019.

FIELD OF THE INVENTION

The invention relates to a backshell housing for receiving a cable and adapted to be attached to a connector. The invention further relates to a set and a method for assembling such a backshell housing.

BACKGROUND

A backshell housing may be mounted on the rear end of a connector, providing a cable passage for inserting a cable into the connector. The backshell housing may be designed to help protect connections from mechanical wear, environmental conditions, and electromagnetic interference (EMI). Therefore, backshell housings are a valuable asset in electronic systems. However, depending on the application, customers may have specific requirements for the size and shape of the backshell housing. When the backshell housing is constructed from a composite material, a different die or mold for every variation of the backshell housing is necessary, which increases production costs.

SUMMARY

A backshell housing includes a pair of housing parts including a first housing part and a second housing part friction welded to one another. A cable passage of the first housing part is continuous with a cable passage of the second housing part.

BRIEF DESCRIPTION OF THE DRAWINGS

The invention will now be described by way of example with reference to the accompanying Figures, of which.

DETAILED DESCRIPTION OF THE EMBODIMENT(S)

Figure 2:
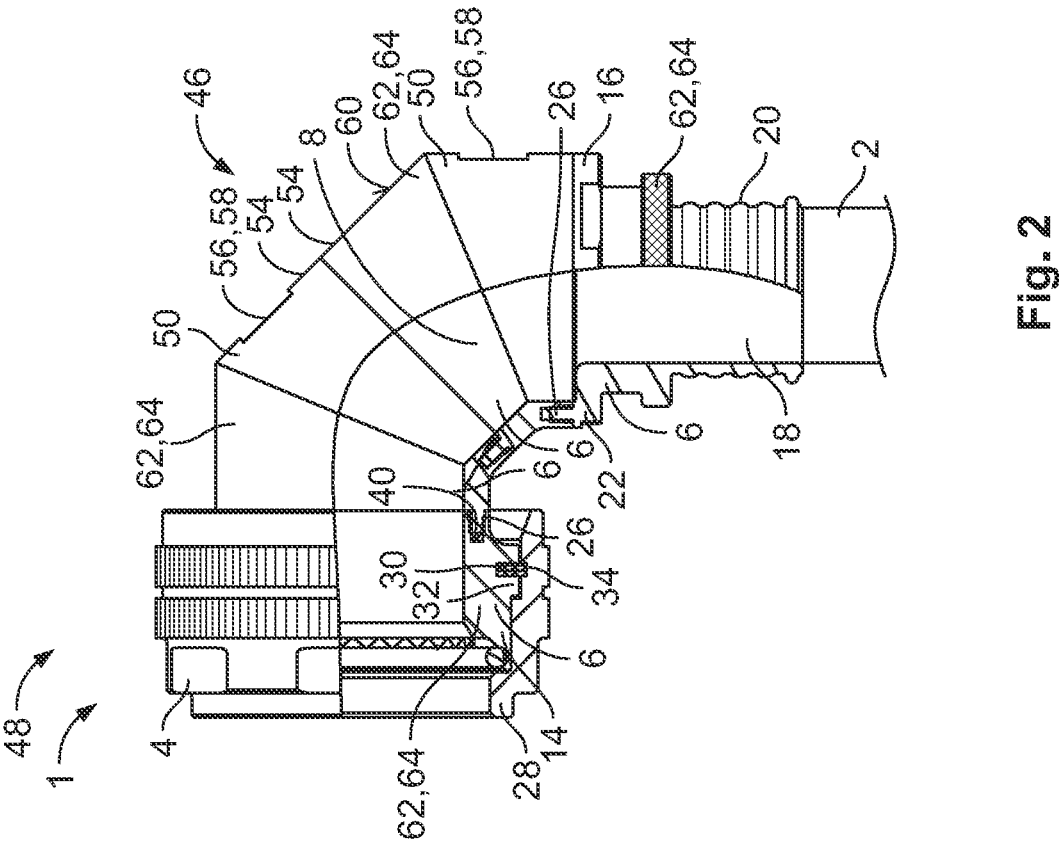
FIG. 2 is a side view of a backshell housing according to a second embodiment.

In the following, the invention is explained in greater detail with reference to the accompanying drawings, in which exemplary embodiments are shown. In the figures, the same reference numerals are used for elements, which correspond to one another in terms of their function and/or structure. According to the description of the various aspects and embodiments, elements shown in the drawings can be omitted if the technical effects of those elements are not needed for a particular application, and vice versa: i.e. elements that are not shown or described with reference to the figures can be added if the technical effect of those particular elements is advantageous in a specific application.

A first embodiment of an inventive backshell housing 1 is described with reference to FIG. 1. The backshell housing 1 for receiving a cable 2 and adapted to be attached to a connector 4, such as an electric connector and/or a fiber-optic connector or a hybrid connector, comprises at least two housing parts 6, wherein the at least two housing parts 6 are friction welded to one another. Each housing part 6 of the at least two housing parts comprises a cable passage 8, the cable passage 8 of a first housing part 10 of the at least two housing parts 6 being continuous with the cable passage 8 of a second housing part 12 of the at least two housing parts 6.

The at least two housing parts 6 may be formed by a thermoplastic material, particularly a polyimide, such as polyetherimide. To further reinforce the strength and/or stiffness of the material, the material may be further reinforced by glass fibers.

The at least two housing parts 6 are joined together by friction welding, allowing for a rigid and stable connection without having to introduce a further component such as an adhesive, which would dissolve during a plating process. The orientation of the housing parts 6 relative to one another, particularly the rotational orientation, may be determined individually for each backshell housing 1 during the welding process. Consequently, it is possible to manufacture different variations of the backshell housing 1 without having to provide a costly die for each variation.

In the figures, a cut section is shown to demonstrate the interaction between the at least two housing parts 6. However, it is acknowledged that the welding features 14 shown in the figures may actually only be visible before the welding process and are just shown for demonstrative purposes. After welding, a continuous section of material may be formed at a joint between the at least two housing parts 6. No or only little gaps, e.g. air gaps, are formed in the welded joint, further increasing the strength and reliability of the joint.

In an embodiment, the at least two housing parts 6 are spin welded to one another. During spin welding, one housing part of the at least two housing parts 6 is held stationary while the other housing part 6 is rotated and pressed against the stationary housing part 6. Due to the friction generated between the housing parts 6, the material of the at least two housing parts, at least at the interface between the at least two housing parts 6, melts. During the cooling period after the material has melted, the two housing parts 6 are pressed together in a predetermined relative rotational position to one another, rigidly connecting the at least two housing parts 6 in that predetermined position. Furthermore, during spin welding, the heat is evenly generated circumferentially at the interface between the housing parts 6 forming a strong weld having essentially the same resistance to fracture in each radial direction, e.g. due to a high bending moment.

Figure 1:
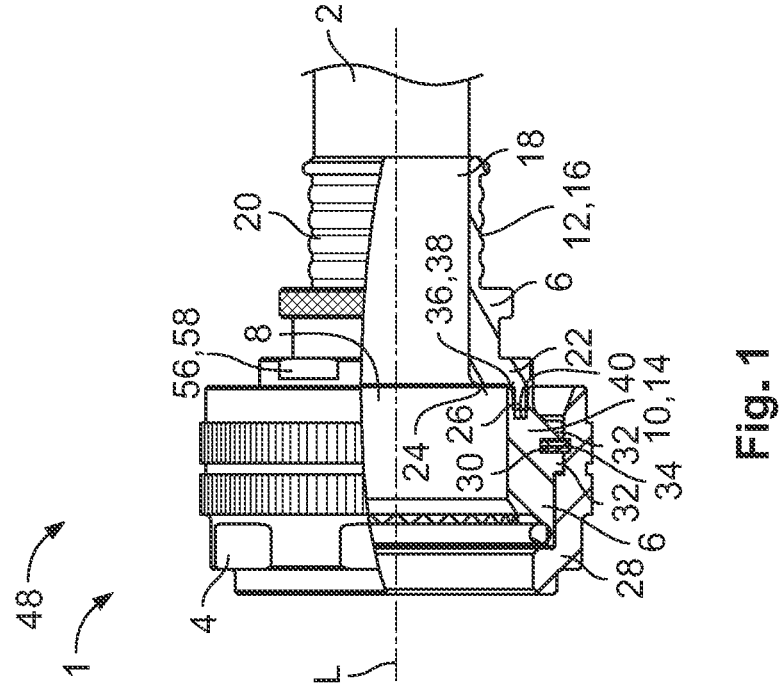
FIG. 1 is a side view of a backshell housing according to a first embodiment.

FIG. 1 shows an embodiment of the backshell housing 1, wherein the backshell housing 1 is adapted to extend along a longitudinal axis L from a rear end of the connector 4. The backshell housing 1 comprises two housing parts 6, wherein the first housing part 10 is a connector end part 14 adapted to be attached to the connector 4 and the second housing part 12 is a cable end part 16 having a cable inlet opening 18 for receiving the cable 2.

Figure 4:
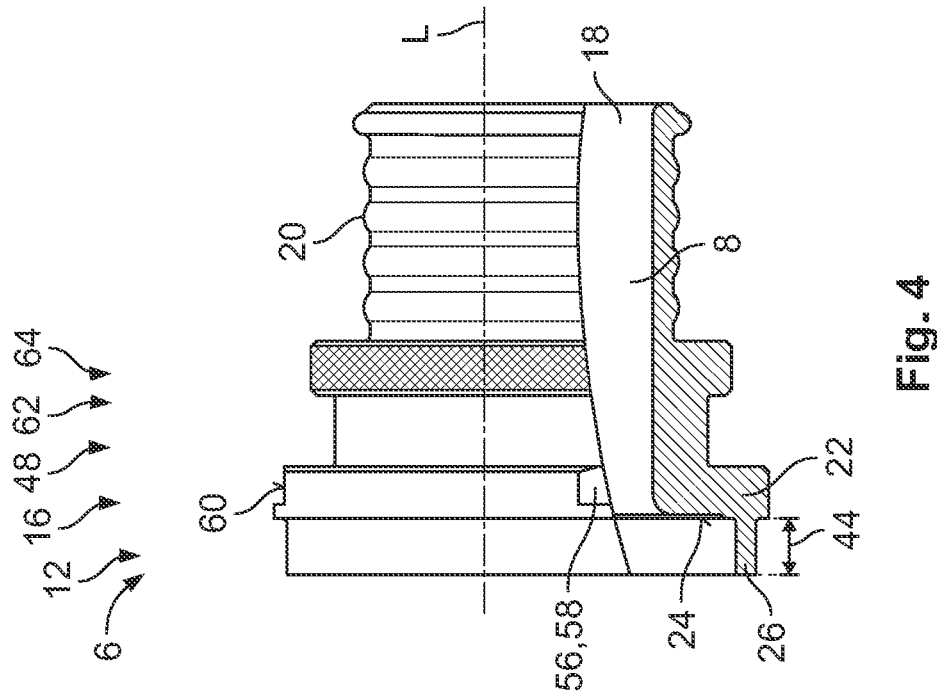
FIG. 4 is a side view of a second housing part of the backshell housing.
Figure 3:
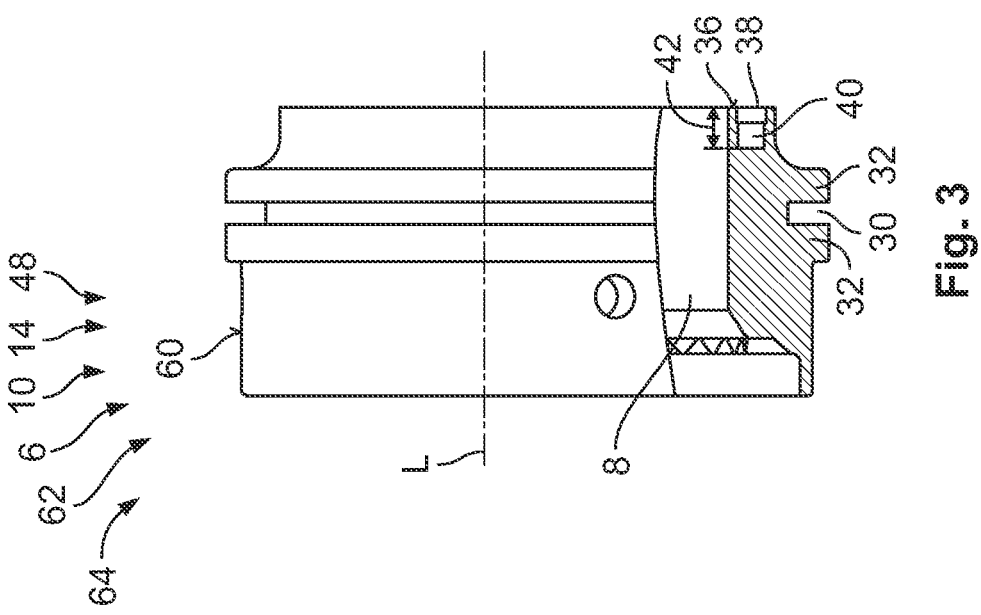
FIG. 3 is a side view of a first housing part of the backshell housing.

In an embodiment, the connector 4 may be a connector interface 28 adapted to mount the backshell housing 1 to a further connector, e.g. a plug connector. The connector end part 14 is shown in FIG. 3 and the cable end part 16 is shown in FIG. 4. The connector interface 28 may for example be a coupling nut, which can receive the backshell housing 1 on one end and be rigidly mounted to the plug connector 4, particularly a housing of the plug connector 4, e.g. by a threaded connection.

The cable inlet opening 18 may be adapted to the diameter of the cable 2, so that the cable end part 16 may at least partially be sleeved around the cable 2 providing an additional strain relief. The cable end part 16 may comprise an essentially cylindrical shape having a neck 20 at a free end forming the cable inlet opening 18. Opposite the free end, the cable end part 16 may comprise a flange 22 protruding radially from the neck 20, as shown in FIGS. 1 and 4. The flange 22 may comprise a front face 24 having an annular welding protrusion 26 arranged coaxially with the cable passage 8 of the cable end part 16 and protruding axially from the front face 24.

The connector end part 14, shown in FIGS. 1-3, may be adapted to be attached to the connector interface 28. In the shown exemplary embodiments, the connector end part 14 is adapted to be received in a rear end of the connector interface 28. In an embodiment, the connector end part 14 comprises an essentially hollow cylindrical shape having an annular slot 30 formed along the outer circumference of the connector end part's 14 body being arranged between two radially protruding collars 32. A latch 34 of the housing, shown in FIGS. 1 and 2, may be received in the annular slot 30 in order to secure the connector end part 14 in the connector interface 28 by a positive fit, preventing a relative movement of the connector end part 14 and the connector interface 28 essentially parallel to the longitudinal axis L. The latch 34 may be a retention ring, i.e. a circlip, fastening the connector end part 14 to the connector interface 28.

The connector end part 14 may be adapted to be mounted in a housing of the connector, particularly a rear opening of the housing. The connector end part 14 may be adapted to be attached to the connector interface 28, which may comprise a cavity at a rear end for at least partially receiving the connector end part 14.

The cable passage 8 at the connector end part 14 may comprise a larger diameter than the cable passage 8 of the cable end part 16, at least at the neck 20, allowing the cable 2 to radially move within the cable passage 8.

A front face 36 facing away from the connector 4 comprises a circumferential frame 38, shown in FIGS. 1 and 3, framing an opening of the cable passage 8. The frame 38 may further comprise a welding notch 40 extending from the front face 36 into the frame 38 essentially parallel to the center axis of the cable passage 8. The welding notch 40 may be annular and may be arranged coaxially with the cable passage 8 and be adapted to receive the welding protrusion 26 formed on the cable end part 16.

As shown in FIGS. 3 and 4, the welding notch 40 may comprise a depth 42 in the axial direction smaller than a length 44 in the axial direction of the welding protrusion 26. Therefore, prior to welding, the front faces 24, 36 of the respective housing parts 14, 16 may be distanced from one another so that only the welding protrusion 26 and the welding notch 40 may be melted due to the heat generated by the friction between the two parts.

Once the welding protrusion 26 starts melting, the housing parts 14, 16 may be pushed together and held at a predetermined relative rotational position to one another. The excessive material of the welding protrusion 26 may further ensure that the welding notch 40 is completely filled with the material of the welding protrusion 26 for establishing a section of continuous material at the welding joint. It is possible to clearly define the moment at which the at least one welding protrusion 26 melts in the at least one welding notch 40. When the at least one welding protrusion 26 melts, it is possible to insert the excessive length of the welding protrusion 26 into the notch 40 so that the opposing end faces abut one another, sealing the cable passage at the joint. The molten part may be pushed into narrow gaps between the remaining welding protrusion 26 and the notch 40, increasing the welding quality and the welding strength at the joint.

In an embodiment, a plurality of separate notches 40 may be provided on the front face 36 arranged in an annular formation and a plurality of separate protrusions 26 on the other end face, each protrusion 26 being adapted to be received in a respective notch 40. The friction may be generated by an oscillating movement or the like. Therefore, the relative rotational position of the housing parts 14, 16 may be pre oriented prior to welding.

In another embodiment, in order to receive a uniform weld joint, the welding notch 40 and the welding protrusion 26 may have a continuous annular shape. Consequently, the housing parts 14, 16 may be welded together having a continuous joint section. This may further increase the reliability of the joint, specifically, in terms of a maximum bending moment it may endure before breakage.

The first embodiment described with reference to FIG. 1 is a simple backshell housing 1 extending along the longitudinal axis L from the rear end of the connector interface 28. However, in many applications it is necessary to provide an angled backshell housing 1 for redirecting the cable 2 via the backshell housing 1 into the connector 4. In FIG. 2, an exemplary embodiment of an angled backshell housing 1 is shown.

The backshell housing 1 shown in FIG. 2 may form a 90° elbow 46 such that the cable passage 8 of the connector end part 14 and the cable passage 8 of the cable end part 16 are arranged in planes, which are inclined to one another at about 90°. The connector end part 14 and the cable end part 16 may be essentially structurally identical to the connector end part 14 and the cable end part 16 discussed with reference to FIGS. 1, 3 and 4. Consequently, the housing parts 6 may be standardized and provided in a set 48 for building a composite backshell housing 1. Therefore, fewer different dies have to be provided in order to form a specific backshell housing 1, reducing the manufacturing and storage costs.

Figure 6:
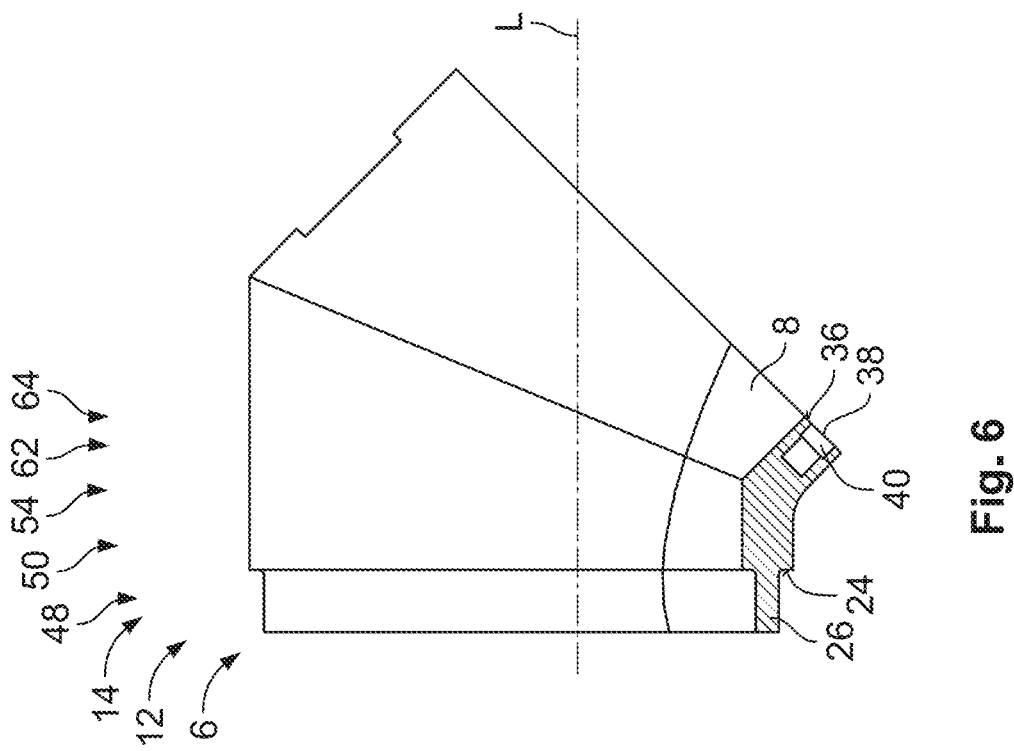
FIG. 6 is a side view of an elbow intermediate housing part of the backshell housing.
Figure 5:
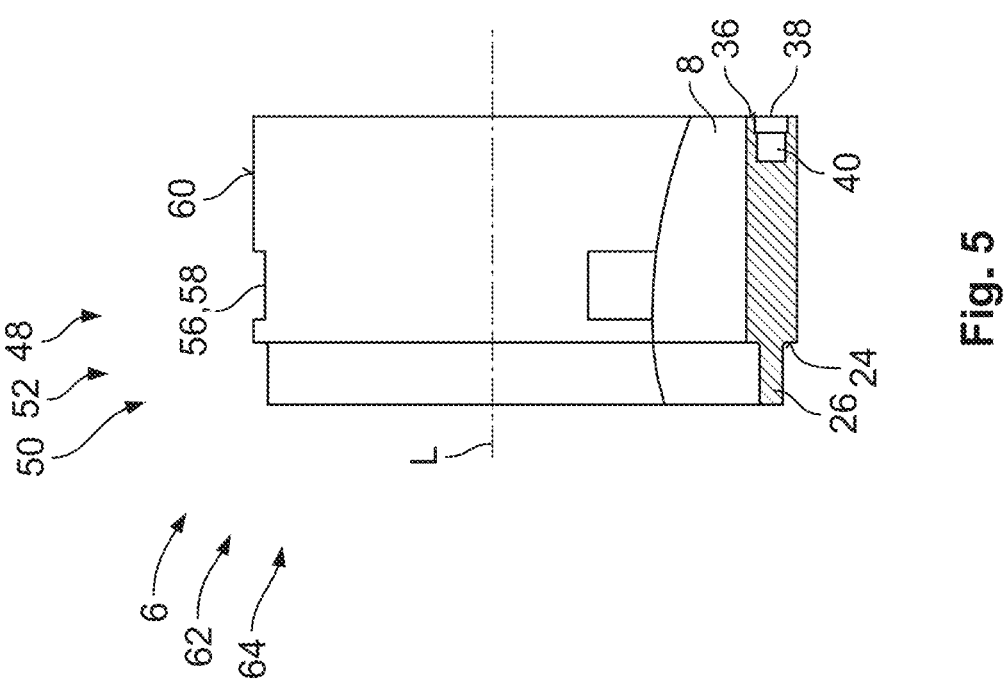
FIG. 5 is a side view of a straight intermediate housing part of the backshell housing.

At least one intermediate housing part 50 may be provided, the at least one intermediate housing part 50 being arranged between the first housing part 10, i.e. the connector end part 14, and the second housing part 12, i.e. the cable end part 16. The at least one intermediate housing part 50 may act as a spacer 52 adapted to increase the distance between two further housing parts 6, as shown in FIG. 5, or form an elbow 54, as shown in FIG. 6. The at least one intermediate housing part 50 may be arranged directly between two further intermediate housing parts, the cable end part 16 and the connector end part 14, the cable end part 16 and a further intermediate part 50 and/or the connector end part 14 and a further intermediate part 50.

The at least one intermediate housing part 50 may be adapted to be fiction welded to another housing part 6 at either end of the intermediate housing part 50. Therefore, prior to welding, the intermediate housing part 50 may feature the welding protrusion 26 at one end and the welding notch 40 at the other end of the intermediate housing part 50. Consequently, the intermediate housing part 50 may be fiction welded to a further intermediate housing part 50, the connector end part 14 and/or the cable end part 16.

The at least one intermediate housing part 50 may comprise an essentially cylindrical shape and may extend along a longitudinal axis L. Therefore, it is possible to increase the length of the backshell housing 1 may be extended along the longitudinal axis L by the at least one intermediate housing part 50. The at least one intermediate housing part 50 may for example be about 5 mm or about 10 mm long. The length of the backshell housing 1 may be further increased by providing multiple intermediate housing parts 50. In an embodiment, the multiple intermediate housing parts 50 may be structurally identical, so that it is not necessary to produce different housing parts. Multiple structurally-identical intermediate housing parts 50 may be stringed together without having to adjust the blank for manufacturing said intermediate housing parts 50.

The intermediate housing part 50 forming the elbow 54, shown in FIG. 6, may be bent around an approximate 45° angle, such that the respective front faces of each end are arranged in planes inclined to one another at an approximate 45° angle. Consequently, multiples of the 45° angle elbow may be formed by stringing together multiple structurally-identical intermediate housing parts 50 as shown in FIG. 2. In FIG. 2, two intermediate housing parts 50 forming the elbow 54 are friction welded, particularly spin welded to one another forming the composite elbow 46 of the backshell housing 1. Therefore, different composite elbows 46 may be formed by stringing together standardized intermediate housing parts 50.

It should be noted, that the 45° elbow of the intermediate housing part 50 in FIG. 6 is just exemplary, and any other angle may be standardized, such as an approximate 30° angle. The elbow of the intermediate housing part 50 may be an integer of 90°, 120° and/or 180°. However, it has been found that the production of a larger angled intermediate housing part 50 is rather difficult. Thus, a smaller angle such as a 45° or 30° angle may be used as a standardized intermediate housing part 50 forming an elbow 54.

For visually helping in determining the rotational position of the at least two housing parts 6 relative to one another, at least one of the at least two housing parts 6 may comprise at least one orientation feature 56, such as a depression 58 formed on an outer surface 60 of the respective housing part 6.

The depression 58 may further act as an interface for attachment of the tooling equipment during the friction welding process. The orientation feature 56 may help in determining the desired relative rotational position of the respective housing part 6 relative to the other housing parts 6. Every rotational formation in the 360° is possible and can be determined during the friction welding process. Therefore, the number of possible backshell housing configurations can be increased even more.

Each housing part 6 shown in FIGS. 5 and 6 may be formed as a monolithic unit 62, such as an injection molded component 64. Injection molding is a cost-efficient production method particularly for the production of the component in mass numbers. According to the invention, modular housing parts may be attached to one another by friction welding for forming the composite back shell housing 1. Hence, the housing parts 6 may be standardized and provided in the set 48, so that only a limited number of dies are necessary, greatly reducing the manufacturing costs. With the limited number of housing parts 6, it is possible to form a great variety of structurally different back shell housings 1.

In another embodiment, the housing part 6 may be formed as a multi component molded piece, wherein the welding protrusion 26 may be optimized for bonding with the material at the welding notch 40 during the friction welding process. A different material, being optimized for screening, sealing and chemical resistance, may form the remainder of the housing part 6.

Figures 7, 8:
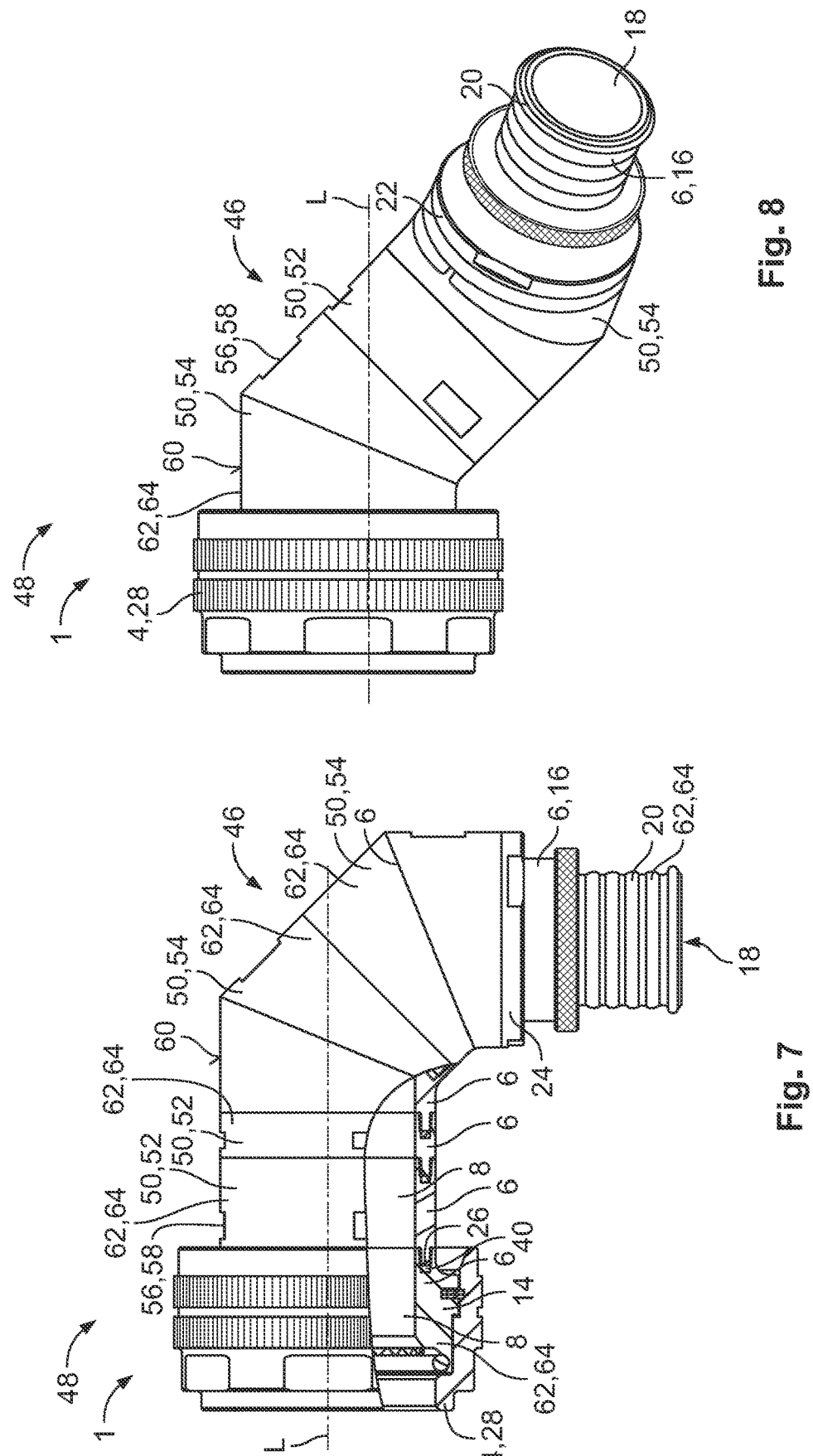
FIG. 7 is a side view of a backshell housing according to a third embodiment.
FIG. 8 is a side view of a backshell housing according to a fourth embodiment.

Further embodiments of a back shell housing 1 are depicted in FIGS. 7 and 8. The back shell housing 1 of FIG. 7 differs from the back shell housing 1 shown in FIG. 2 in that two intermediate housing parts 50 are arranged as spacers 52 between the connector end part 14 and the composite elbow 46. The spacers 52 may extend axially essentially parallel to the longitudinal axis L and may comprise different lengths in a direction essentially parallel to the longitudinal axis L. One spacer 52 may, for example, have a length of about 10 mm while the other has a length of about 5 mm. Thus, a composite spacer having a length of about 15 mm may be formed. The spacers 52 may be inserted individually or in combination as required at any point between the connector end part 14 and the cable end part 16.

The back shell housing 1 of FIG. 8 comprises a composite elbow 48 formed by two elbow 54 intermediate housing parts, which are arranged in a different rotational position to one another, such that the respective elbows 54 are inclined to one another. In order to reduce the strain to the cable due to the abrupt change of direction of the cable passage, at least one spacer 52 may be provided between the two elbows 54.

What is claimed is:

1. A backshell housing, comprising:
a pair of housing parts including a first housing part and a second housing part friction welded to one another, each of the housing parts is formed of a thermoplastic material, a cable passage of the first housing part is continuous with a cable passage of the second housing part, the second housing part has a welding protrusion protruding axially from a front face of a flange of the second housing part, the front face of the flange is wider than the welding protrusion in a direction perpendicular to a longitudinal axis of the second housing part, the welding protrusion is received in a welding notch of the first housing part, the housing parts are friction welded at an interface of the welding protrusion and the welding notch to form a continuous section of the thermoplastic material at the interface that connects the housing parts.

2. The backshell housing of claim 1, further comprising an intermediate housing part arranged between the housing parts.

3. The backshell housing of claim 2, wherein, prior to joining by friction welding, the intermediate housing part has a welding protrusion and a welding notch on opposite ends.

4. The backshell housing of claim 1, wherein at least one of the housing parts forms an elbow.

5. The backshell housing of claim 4, wherein the elbow is bent around about 45°.

6. The backshell housing of claim 1, wherein, prior to joining by friction welding, a length of the welding protrusion is longer than a depth of the welding notch.

7. The backshell housing of claim 6, wherein, at the interface, the thermoplastic material of the welding protrusion completely fills the welding notch.

8. The backshell housing of claim 1, wherein the welding protrusion and/or the welding notch has an essentially annular shape.

9. The backshell housing of claim 1, wherein, prior to joining by friction welding, the welding protrusion and/or the welding notch is coaxial with the cable passage.

10. The backshell housing of claim 1, wherein the housing parts are each formed as an injection molded component.

11. The backshell housing of claim 1, wherein the welding protrusion is integrally formed in a single piece with the second housing part.

12. The backshell housing of claim 1, wherein the welding notch extends from a front face of the first housing part into a frame of the first housing part.

13. The backshell housing of claim 12, wherein the welding notch extends around a circumference of the first housing part, and the welding protrusion extends around a circumference of the second housing part.

14. The backshell housing of claim 13, wherein the welding notch and the welding protrusion form the continuous section of the thermoplastic material at the interface around the circumference of the first housing part and the circumference of the second housing part.

15. The backshell housing of claim 1, wherein the continuous section of the thermoplastic material at the interface forms a rigid connection between the housing parts.

16. A set for assembling a backshell housing, comprising:
a pair of housing parts including a first housing part and a second housing part friction welded to one another, each of the housing parts is formed of a thermoplastic material, a cable passage of the first housing part is continuous with a cable passage of the second housing part, the second housing part has a welding protrusion protruding axially from a front face of a flange of the second housing part, the front face of the flange is wider than the welding protrusion in a direction perpendicular to a longitudinal axis of the second housing part, the welding protrusion is received in a welding notch of the first housing part, the housing parts are friction welded at an interface of the welding protrusion and the welding notch to form a continuous section of the thermoplastic material at the interface that connects the housing parts.

17. The set of claim 16, further comprising an intermediate housing part friction welded between the housing parts.

18. A method for assembling a backshell housing, comprising:
providing a pair of housing parts each having a cable passage, each of the housing parts is formed of a thermoplastic material, the housing parts include a first housing part and a second housing part, the second housing part has a welding protrusion protruding axially from a front face of a flange of the second housing part, the front face of the flange is wider than the welding protrusion in a direction perpendicular to a longitudinal axis of the second housing part, the welding protrusion is received in a welding notch of the first housing part; and
friction welding the housing parts to one another with the cable passage of the first housing part continuous with the cable passage of the second housing part, the housing parts are friction welded at an interface of the welding protrusion and the welding notch to form a continuous section of the thermoplastic material at the interface that connects the housing parts.

19. The method of claim 18, wherein the housing parts are welded together by spin welding.

* * * * *